Dec. 28, 1965    W. E. PARKHURST ET AL    3,225,833
WELL PRESSURE CONTROL APPARATUS WITH PROTECTOR DEVICE
Original Filed Nov. 15, 1961    3 Sheets-Sheet 1

INVENTORS
WARREN E. PARKHURST
CASSIUS L. TILLMAN III

BY *Albert J. Kramer*
ATTORNEY

Dec. 28, 1965    W. E. PARKHURST ET AL    3,225,833
WELL PRESSURE CONTROL APPARATUS WITH PROTECTOR DEVICE
Original Filed Nov. 15, 1961    3 Sheets-Sheet 2
FIG. 3.
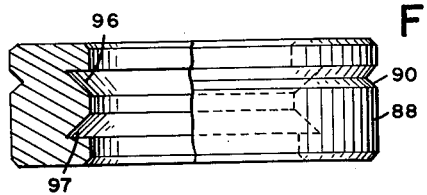
FIG. 9.
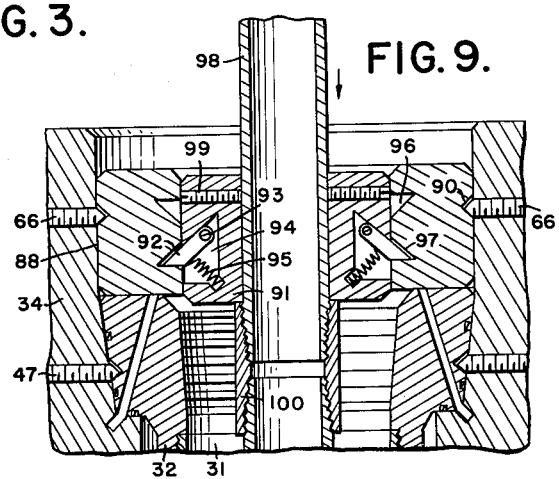
FIG. 4.
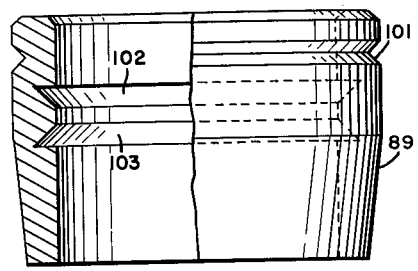
FIG. 5.
FIG. 10.
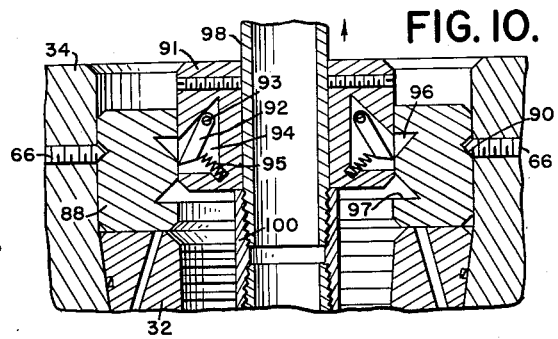
FIG. 6.
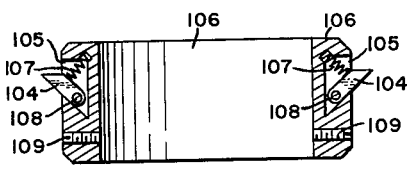
FIG. 11.
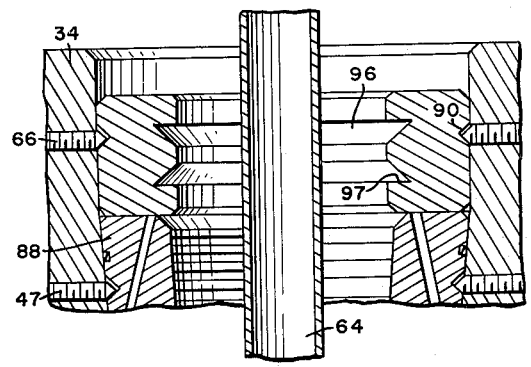
FIG. 7.
FIG. 8.
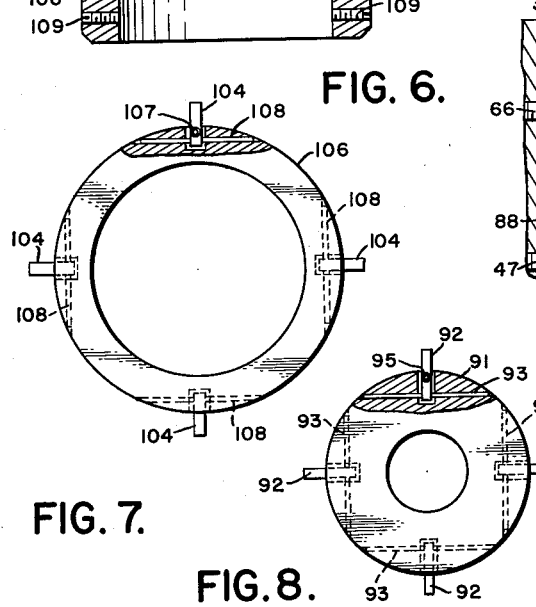
INVENTORS
WARREN E. PARKHURST
CASSIUS L. TILLMAN III
BY Albert J. Kramer
ATTORNEY

*INVENTORS*
WARREN E. PARKHURST
CASSIUS L. TILLMAN III

BY *Albert G. Kramer*
ATTORNEY

United States Patent Office 3,225,833
Patented Dec. 28, 1965

3,225,833
WELL PRESSURE CONTROL APPARATUS WITH PROTECTOR DEVICE
Warren E. Parkhurst 210 Bristol Place, New Orleans 14, La., and Cassius L. Tillman III, Peter Road, Harvey, La.
Original application Nov. 15, 1961, Ser. No. 152,576, now Patent No. 3,151,680, dated Oct. 6, 1964. Divided and this application June 5, 1964, Ser. No. 379,759
6 Claims. (Cl. 166—207)

This is a division of application Ser. No. 152,576, filed Nov. 15, 1961, now Patent No. 3,151,680.

This invention relates to oil and gas wells and it is more particularly concerned with improvements in control apparatus and the installation thereof.

An object of the invention is the provision of such apparatus which can be installed under conditions that are ordinarily difficult, impractical or impossible, due to adverse natural causes, such as in deep water or other technical difficulties.

A further object of the invention is the provision of means for preventing damage to well equipment by tools and parts at all times during construction and installation.

These and still further objects, advantages and features of the invention will appear more fully from the following description in conjunction with the accompanying drawing showing embodiments of the invention by way of illustration and not by way of limitation.

In the drawing:

FIG. 3 is an elevational view, partly in section, of a form of protector device adapted for use with the invention in connection with installation of the well tubing.

FIG. 4 is an elevational view, partly in section, of a form of protector device adapted for use with the invention in connection with the installation of the inner casing and ancillary equipment.

FIG. 5 is a vertical sectional view of a transfer device adapted for use with the protector of FIG. 3.

FIG. 6 is a vertical sectional view of a transfer device adapted for use with the protector of FIG. 4.

FIG. 7 is a top plan view of FIG. 6, partly broken away.

FIG. 8 is a top plan view of FIG. 5, partly broken away.

FIG. 9 is a vertical sectional view of a fragmentary portion of the installation illustrating the relative positions of the protector, corresponding transfer device, and well tubing during placement of the protector.

FIG. 10 is a view similar to FIG. 9 illustrating the technique for removal operations.

FIG. 11 is a view similar to FIGS. 9 and 10 after removal of the transfer device.

Figure 1:
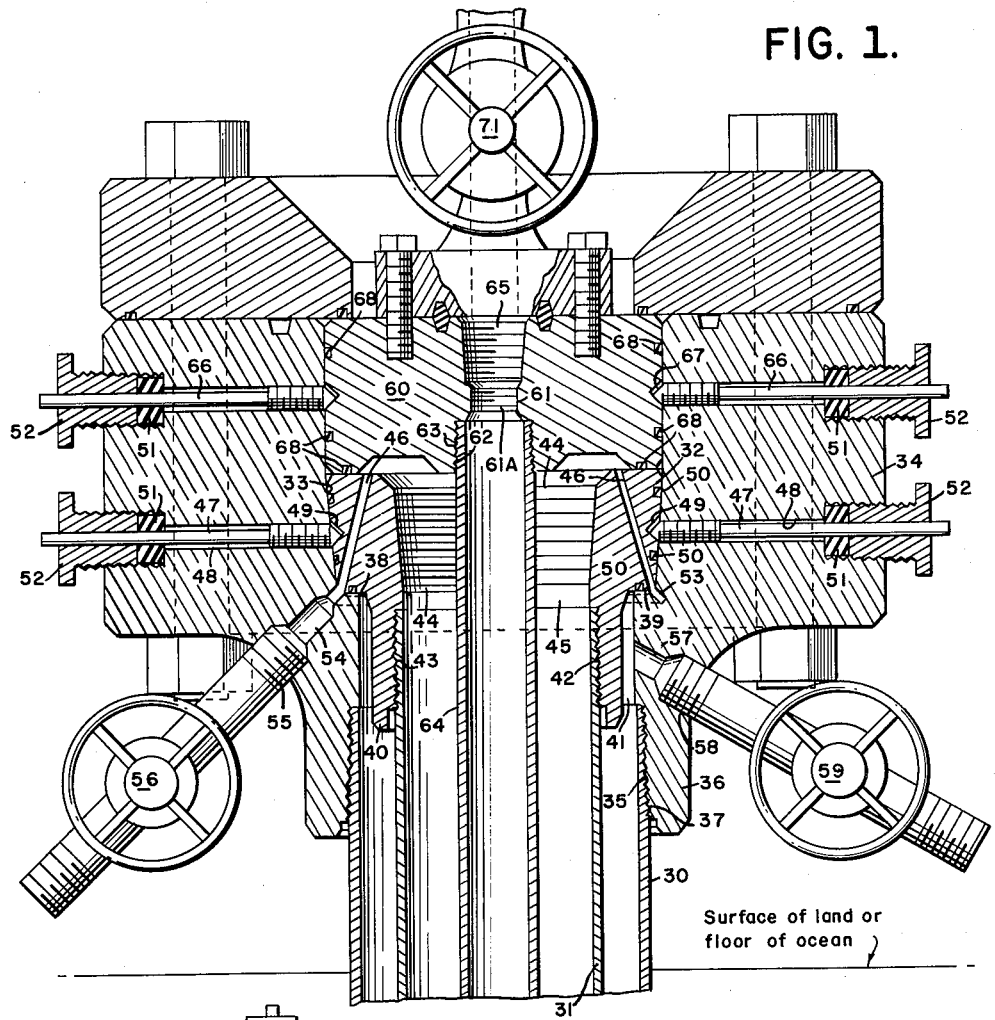
FIG. 1 is a vertical sectional view of an assembled well control system in accordance with an embodiment of the invention generally along the line 1—1 of FIG. 2.
Figure 2:
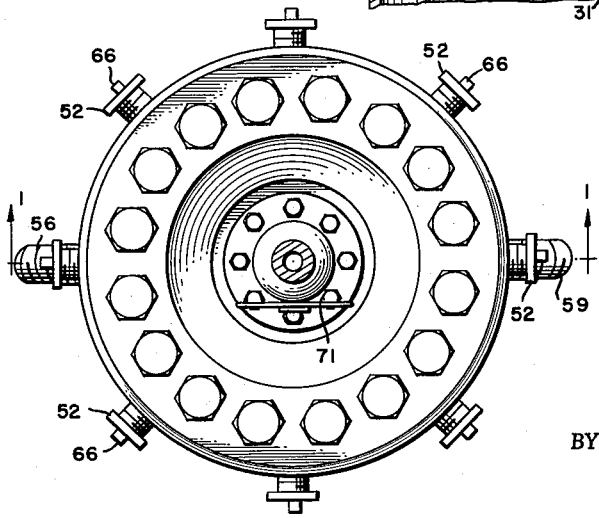
FIG. 2 is a top plan view of the embodiment.
Figure 12:
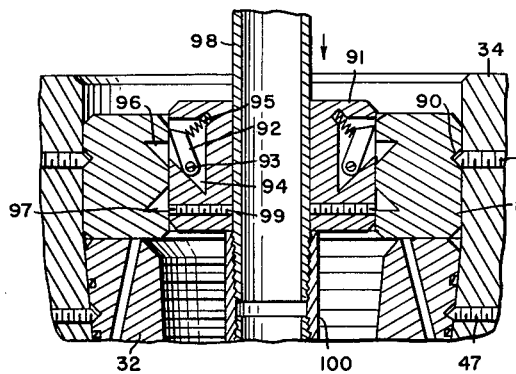
FIG. 12, 13 and 14 are a series of sectional views illustrating successive steps in the procedure for removing the protector device associated with the operations carried out through casing hanger 32.
Figure 13:
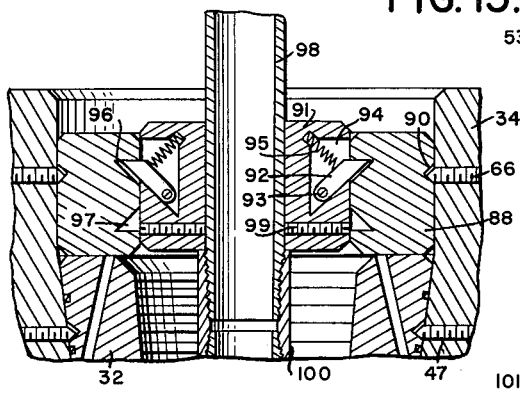
Figure 14:
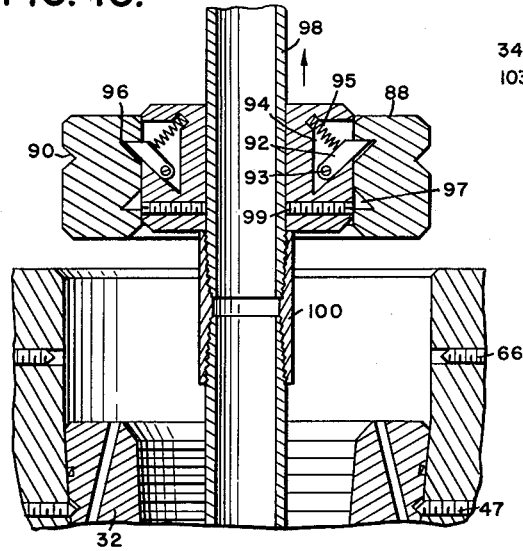
Figure 15:
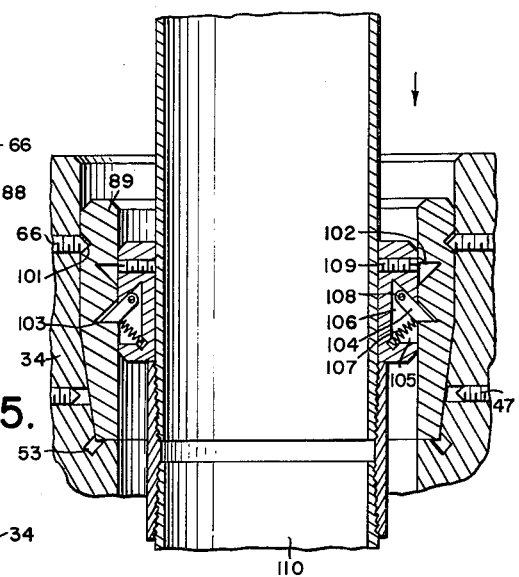
FIG. 15 is a vertical sectional view illustrating the procedure for inserting the lower bowl protector of FIG. 4 by means using the inner casing 31 and the corresponding transfer device of FIGS. 6 and 7.
Figure 16:
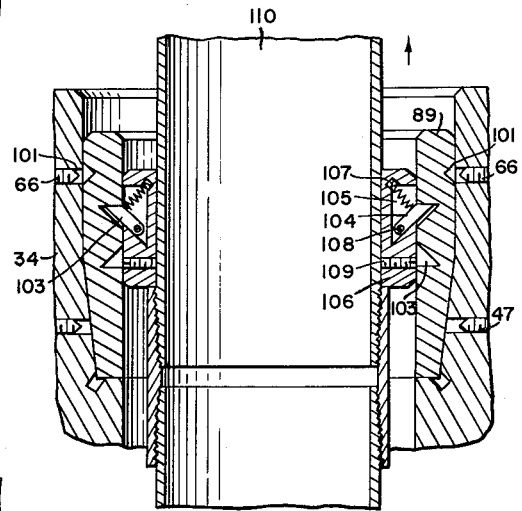
FIG. 16 is a view similar to FIG. 15 modified to show the corresponding protector removal procedure.

Referring with more particularity to the drawing in which like numerals designate like parts the invention is illustrated in connection with a conventional outer or surface casing tubing 30 set in the ground in the conventional manner and inner casing tubing 31 within the outer casing tubing 30. The inner casing tubing string is supported by means of a tubular hanger 32 disposed in the lower part of a hollow center section or bowl 33 of a casing head or body 34 mounted on the upper end of the outer casing tubing 30. Inner threads 35 of a dependent flange 36 at the bottom of the body 34 engage external threads 37 of the casing 30.

Above the threads 35 the hollow portion of the body 34 is somewhat restricted to provide an annular upwardly facing shoulder 38 to engage a correspondingly downwardly facing annular shoulder 39 of the hanger 32. The outer surface of the hanger 32 above the shoulder 39 is enlarged and downwardly tapered to register with the adjacent correspondingly shaped surface of the bowl 33.

An annulus 40 of the hanger 32 projects downwardly within the dependent flange 36 and is recessed to provide an annular space 41 between it and the flange. The annulus 40 has interior threads 42 which engage exterior threads 43 of the casing tubing 31. The upper portion of the hanger 32 above the threads 42 is also provided with threads 44 separated from the threads 43 by a median section 45. These upper threads are for the purpose of temporarily engaging the lower end of a pipe (not shown) to facilitate setting the hanger in place after which lock screws 47 are engaged and the pipe is removed.

The wall of the hanger 32 is provided with a series of circumferentially spaced ducts 46 each extending diagonally downward from a point adjacent the inner rim of the wall to the outer edge at the bottom, substantially as shown. Other functionally equivalent positions, however, may be used for the ducts.

The hanger 32 is held in seated position by means of a group of circumferentially spaced lock screws 47 that pass through lateral apertures 48 in the body 34. These lock screws have a conical point at their inner ends and are adapted to engage an annular V-shaped groove 49 on the periphery of the hanger 32 whereby the hanger is wedged into position against high pressure gaskets 50 set in grooves of the hanger to effect a high pressure fluid seal. The lock screws are sealed from fluid leakage after they are set in position by means of conventional glands at the ends of the stems thereof comprising gland packing 51 and gland nuts 52.

An annular groove 53 is provided in the body 34 adjacent the lower ends of the ducts 46 as a discharge manifold. One or more discharge apertures, such as the aperture 54 is provided through the wall of the body 34 in communication with the groove 53. The outer portion 55 of the aperture 54 is enlarged and provided with threads to engage a discharge control valve 56.

Another opening 57 is provided in the body 34 in communication with the annular space 41, an outer portion 58 being enlarged and threaded to receive a valve 59 for the control of material flowing between the casings 30 and 31.

A second hanger 60 is disposed in the upper part of the bowl 33 of the body 34 directly on top of the hanger 32. It is provided with an axial bore 61, the lower end of which contains threads 62 to engage the threads 63 at the upper end of the well tubing 64. The upper end of the bore 61 is provided with a separate threaded section 65 to engage temporarily a threaded stem or pipe (not shown) during manipulation thereof to set the hanger in place after which the stem or pipe is removed. A third set of threads 61A is provided for the installation of a duct plug or similar device to control pressure in the tubing prior to installation of the valve 71. This plug may be removed through the duct of valve 71. The hanger 60 is held in place by lock screws 66 engaging a circumferential V-groove 67 similar to the lock screws 47. High pressure sealing gaskets 68 are provided in grooves of the hanger 60 adjacent the body substantially as shown.

The actual construction of the well and casing placement prior to the setting of the hangers requires that the casing and tubing strings be passed downwardly through the body 34. The inner surfaces of the body are, therefore, subjected to possible damage by the casing and tubing strings and other parts during their installation. Such damage to the body adversely affects the sealing of the hangers thereto, causing leakage, misplacement, and other undesirable effects.

In order to prevent such damage there are provided wear protector rings 88 and 89 for use during the installation of the inner casing tubing, well pipes, and the placement and retrieving of ancillary equipment.

The protector ring 88 is adapted to set in the space normally occupied by the hanger 60 and it is provided with a circumferential V-groove 90 for the reception of the lock screws 66 to hold it in place. To facilitate both the placement and subsequent removal of the protector ring there is provided a transfer or retriever device 91 that fits the inside diameter of the protector ring 88 and is latchable thereto by means of fingers 92 hinged on pins 93 in recesses 94 outwardly biased to a protracted position by springs 95. These fingers are retractable within their recesses against the force of the said springs. The transfer device can be positioned with the fingers projecting either upwardly or downwardly. In the upwardly projecting position the outer ends of the fingers 92 are adapted to engage and mesh with the upper groove 96 of a pair of cooperating latching grooves 96 and 97 on the interior of the ring. (See FIGS. 20, 21 and 22.) When the position of the transfer device is inverted with the fingers projecting downwardly they are adapted to engage and register with the lower latching groove 97 (see FIGS. 17 and 18). Tension of the springs 95 are collectively sufficient to support the weight of the protector ring in the latter position of engagement but are yieldable under a greater force than can be applied by clamping the ring to the body 34 and moving the transfer device upwardly as illustrated in FIG. 18. Thus the protector ring may be installed by slipping the transfer device over a pipe section, such as the pipe section 98 and clamping it to the pipe section by means of the set screws 99, preferably abutting the end of a coupler 100. The transfer device is then moved upwardly through the center opening of the protector ring until the fingers 92 latch into the lower groove 97 whereupon the ring can be set in place by manipulating the pipe section 98. The ring is then secured in position by means of the lock screws 66 after which the pipe section 98 is elevated to withdraw the transfer device from the ring through the top (see FIG. 18) thereof. The transfer device can then be removed from the pipe section by removing the coupling 100 and releasing the set screws 99. It is preferred to place the transfer device above or below a coupler so that it will be urged by the coupler in the direction of the applied force.

This procedure insures that if too much force is applied in the downward direction, the transfer device would merely slip and not cause the fingers to be sheared.

Further operations may be carried out through this protector or the well tubing to be lowered through the body 34 may then proceed through the opening in the protector ring. When this has been completed and it is desired to remove the protector ring the transfer device is turned up-side-down and placed on the pipe section 98 preferable above and in abutting engagement with the coupler 100 as shown in FIG. 20. The set screws 99 are then clamped against the pipe 98 and the transfer device lowered through the top of the protector ring as shown (FIGS. 20 and 21) until the fingers 92 latch into position in the upper groove 96. The lock screws 66 are then backed out and the pipe 98 elevated which results in the withdrawal of the protector ring as shown in FIG. 22. The protector ring and transfer device may then be removed from the pipe 98.

The protector ring 89 is used instead of the protector ring 88 during drilling and other operations prior to the installation of inner casing 31 and the setting or recovery of ancillary equipment. It is similar to the protector ring 88 and is adapted to be disposed in the body 34 at the place normally occupied by both the upper and lower hangers 32 and 60. It is also held in position by the lock screws 66 which are adapted to engage a circumferential groove 101. There are provided similar upper and lower cooperating latching grooves 102 and 103 for the reception of the outer ends of fingers 104 disposed in recesses 105 of a transfer device or retriever 106 and outwardly biasing springs 107 hingedly mounted on pins 108. The transfer device 106 is provided with set screws 109 to releasibly secure it to a pipe section 110 during withdrawal and removal as explained above in connection with the transfer device 91.

Having thus described our invention, we claim:

1. Apparatus for a well installation having outer casing, a body member adapted to be attached to and supported on the upper end of the casing, said body member having a vertical opening axially therethrough, said opening having a relatively enlarged upper bowl portion and a restricted lower portion, said apparatus comprising the combination of a wear protector ring adapted to lie in said bowl portion, said ring having annular grooves on its interior side and a transfer device for lifting the ring into and out of the bowl, said transfer device comprising an annular member having recesses at its outer periphery, fingers pivotally mounted on the annular member in said recesses adapted to engage and latch into said groove, means resiliently biasing the outer ends of the fingers to a protracted position on the exterior of the recesses, the cross-sectional configuration of the grooves being right triangular, the hypotenuses thereof lying inwardly and facing each other.

2. Apparatus as defined by claim 1 in which the transfer device has a central axial opening therethrough and means for releasibly clamping to the transfer device a member disposed in said central axial opening.

3. Apparatus as defined by claim 1 in which the wear protector ring has two annular grooves on its interior side, one above the other, for selectively engaging the fingers of the transfer device in opposite relative positions.

4. Apparatus as defined by claim 1 and means for releasibly securing the ring to the body.

5. Apparatus as defined by claim 1 in which the body member includes lock screws radially positioned for protraction into and retraction from the said upper bowl portion and the wear protector ring has peripheral grooves adapted to register with the inner ends of said lock screws in their protracted positions when the wear protector ring is disposed in said upper bowl portion.

6, The combination of a well installation having outer casing, a body member adapted to be attached to and supported on the upper end of the casing, said body member having a vertical opening axially therethrough, said opening having a relatively enlarged upper bowl portion, a restricted lower portion and a wear protector ring in said bowl portion, means releasibly securing the ring to the body, said ring having annular grooves on its interior side, an annular member having recesses at its outer periphery, fingers pivotally mounted on the annular member in said recesses, said fingers being engaged with and latched into said groove, means resiliently biasing the outer ends of the fingers to a protracted position on the exterior of the recesses, the cross-sectional configuration of the grooves being right triangular, the hypotenuses thereof lying inwardly and facing each other.

References Cited by the Examiner

UNITED STATES PATENTS

| | | | |
|---|---|---|---|
| 832,920 | 10/1906 | Morrow | 294—86.24 X |
| 1,607,430 | 11/1926 | Brewster | 166—85 |
| 2,380,068 | 7/1945 | Patton | 29—280 |

CHARLES E. O'CONNELL, *Primary Examiner.*

BENJAMIN HERSH, *Examiner.*